(12) United States Patent
Stammers et al.

(10) Patent No.: US 12,342,224 B2
(45) Date of Patent: Jun. 24, 2025

(54) SYSTEMS AND METHODS FOR PROVIDING MULTI-LAYER CLIENT ASSURANCE ARCHITECTURE FOR PRIVATE CELLULAR NETWORKING

(71) Applicant: Cisco Technology, Inc., San Jose, CA (US)

(72) Inventors: Timothy P. Stammers, Raleigh, NC (US); Dusko Zgonjanin, Palo Alto, CA (US); Flemming Stig Andreasen, Marlboro, NJ (US)

(73) Assignee: Cisco Technology, Inc., San Jose, CA (US)

( * ) Notice: Subject to any disclaimer, the term of this patent is extended or adjusted under 35 U.S.C. 154(b) by 469 days.

(21) Appl. No.: 17/837,219

(22) Filed: Jun. 10, 2022

(65) Prior Publication Data
US 2023/0403609 A1    Dec. 14, 2023

(51) Int. Cl.
*H04L 41/0631* (2022.01)
*H04L 41/34* (2022.01)
(Continued)

(52) U.S. Cl.
CPC ......... *H04W 28/24* (2013.01); *H04L 41/0631* (2013.01); *H04L 41/34* (2022.05); *H04L 41/5019* (2013.01); *H04L 41/5067* (2013.01); *H04L 43/026* (2013.01); *H04L 43/091* (2022.05); *H04L 43/12* (2013.01); *H04L 43/55* (2022.05); *H04W 8/18* (2013.01);
(Continued)

(58) Field of Classification Search
CPC ..... H04L 41/02–5096; H04L 43/02–55; H04L 47/10–83; H04L 69/02–40; H04W 8/18–245; H04W 16/02–225; H04W 24/02–10; H04W 28/02–26; H04W 80/02–12; H04W 84/005–22; H04W 88/005–188; H04W 92/02–24
See application file for complete search history.

(56) References Cited

U.S. PATENT DOCUMENTS

2013/0227103 A1* 8/2013 Garimella ............. H04L 41/147
2016/0366233 A1* 12/2016 Le ........................ H04L 41/0843
(Continued)

FOREIGN PATENT DOCUMENTS

EP      3907933      11/2021

*Primary Examiner* — Timothy J Weidner
(74) *Attorney, Agent, or Firm* — Polsinelli P.C.

(57) ABSTRACT

A system and method of performing multi-layer client assurance in a private cellular network includes a plurality of assurance points within the network. The method includes receiving, by a network entity, a plurality of parameter sets from the plurality of assurance points. Each of the plurality of assurance points can be configured to obtain measurements from a portion of the private cellular network corresponding to a client assurance layer in a client assurance stack. The method can include combining a first parameter set from the plurality of parameter sets with a second parameter set from the plurality of parameter sets. The first parameter set can be associated with a first client assurance layer and the second parameter set is associated with a second client assurance layer. The method can include determining, based on the combined parameter set, a network service level corresponding to the client device.

12 Claims, 9 Drawing Sheets

(51) Int. Cl.
*H04L 41/5019* (2022.01)
*H04L 41/5067* (2022.01)
*H04L 43/026* (2022.01)
*H04L 43/091* (2022.01)
*H04L 43/12* (2022.01)
*H04L 43/55* (2022.01)
*H04W 8/18* (2009.01)
*H04W 16/16* (2009.01)
*H04W 24/08* (2009.01)
*H04W 24/10* (2009.01)
*H04W 28/02* (2009.01)
*H04W 28/24* (2009.01)
*H04W 80/02* (2009.01)
*H04W 80/04* (2009.01)
*H04W 80/06* (2009.01)
*H04W 80/08* (2009.01)
*H04W 84/04* (2009.01)
*H04W 88/02* (2009.01)
*H04W 88/08* (2009.01)
*H04W 88/16* (2009.01)
*H04W 88/18* (2009.01)
*H04W 92/02* (2009.01)

(52) U.S. Cl.
CPC ........... *H04W 16/16* (2013.01); *H04W 24/08* (2013.01); *H04W 24/10* (2013.01); *H04W 28/0247* (2013.01); *H04W 28/0268* (2013.01); *H04W 28/0273* (2013.01); *H04W 80/02* (2013.01); *H04W 80/04* (2013.01); *H04W 80/06* (2013.01); *H04W 80/08* (2013.01); *H04W 84/045* (2013.01); *H04W 88/02* (2013.01); *H04W 88/08* (2013.01); *H04W 88/16* (2013.01); *H04W 88/18* (2013.01); *H04W 92/02* (2013.01)

(56) References Cited

U.S. PATENT DOCUMENTS

| | | |
|---|---|---|
| 2021/0058306 A1 | 2/2021 | Szigeti et al. |
| 2021/0160153 A1 | 5/2021 | Akman et al. |
| 2021/0250814 A1 | 8/2021 | Poe et al. |
| 2021/0297326 A1 | 9/2021 | Xu et al. |

* cited by examiner

SYSTEMS AND METHODS FOR PROVIDING MULTI-LAYER CLIENT ASSURANCE ARCHITECTURE FOR PRIVATE CELLULAR NETWORKING

TECHNICAL FIELD

The subject matter of this disclosure relates to private cellular networking and more specifically to providing a multi-layer client assurance architecture in the context of private cellular networking.

BACKGROUND

Wireless communications systems are deployed to provide various telecommunications and data services, including telephony, video, data, messaging, and broadcasts. A fifth-generation (5G) mobile standard calls for higher data transfer speeds, greater number of connections, and better coverage, among other improvements. The advantages offered by a 5G network can be leveraged by private industries that are driving the deployment of private networks, which may also be referred to as Non-public Networks (NPNs) or Private Cellular Networks (PCNs).

In some cases, a PCN can include a combination of cloud-hosted and/or cloud-managed modules together with on-premises modules that support various vertical industry use cases associated with service level requirements. In some examples, the service or service provider may determine performance of the service based on parameters or key-performance indicators (KPIs) across radio access network (RAN) infrastructure, private cellular connectivity, switching, subscription data systems, business support systems (BSS), etc. However, existing PCN architectures do not evaluate the performance of services based on information from clients and/or devices that are using the service.

BRIEF DESCRIPTION OF THE DRAWINGS

In order to describe the manner in which the above-recited and other advantages and features of the disclosure can be obtained, a more particular description of the principles briefly, described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other modules, components and configurations may be used without parting from the spirit and scope of the disclosure.

Overview

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

A Private Cellular Network (PCN) can leverage localized micro towers and small cells to provide coverage and connectivity, similar to a scaled-down version of a public cellular network. It can be a dedicated network that combines the control and fixed cost of a private network with the flexibility, security, and macro-network benefits of cellular.

5GaaS (5G as a service) is built on the premise that a combination of cloud-hosted, cloud-managed and on-premises modules will support various vertical industry use cases, each with a specific set of service level requirements. The service determines the actual service behavior from a combination of various key performance indicators (KPIs), events, logs, and so forth across a radio access network infrastructure, private cellular connectivity, switching, subscription data systems and a telecom business support system. These may be deployed as a combination of on-premises and cloud-hosted (and others, e.g. co-located) locations. It is assumed that combining network-sourced information provides sufficient information to assess service behavior. There is no information provided directly from the clients and/or devices using the service. However, service behavior is most accurately reflected by an end-point's perception of the service. For example, the end-point may be a number of different devices connected to the network with an end-point perception. The end-point may be a client and/or device using the service or an application executing on the service. The end-point perception may not however accurately reflect the actual service behavior.

The disclosed solutions herein address the missing aspects described above which can result in an end-point view of service behavior that is not accurate. Disclosed is a multi-layer assurance approach distributed across multiple service clients or devices. The information obtained from various assurance points can be used to tailor a combination of approaches at the client/end device to test and assure the specific application flows for a given private network deployment. Additionally, by understanding the design goals of a deployed 5GaaS private cellular network, the disclosed tools can also exercise and measure the specific aspects that comprise the service level agreements with the customer of the service.

In some aspects, a method is disclosed whereby the expected behavior is learned from configuration of various network layers, e.g. radio, IP networking, server configuration and application placement and tuning. The method can include a concept wherein the capabilities of the clients are determined by the supported use-cases to best model the behavior of the various devices a customer expects to connect to the private cellular network. The method also can include a templating approach for deriving assurance point characteristics based on designed and observed service behaviors.

In some aspects, a system is disclosed wherein the service deployment for a private cellular network incorporates multiple assurance points deployed and managed as part of the service. The system can include where client-driven assurance is combined with various service layer network-hosted assurance measures to provide a mechanism for end-to-end use-case SLA compliance.

The benefits of this disclosure include enabling a company to provide a 5GaaS solution incorporating client assurance metrics that can be tailored to the specific use-cases employed by, an enterprise customer. The assurance metrics can measure application performance relative to a baseline value and when changes occur from the baseline expectation, then steps can occur to improve performance. The system a also be incorporated in a fully on-premises private cellular network operated by the customer for the same purposes. Delivering such a client capability on a private cellular enabled router (IR (integrated router), ISR (integrated services router), cellular gateway) further emphasizes the breadth of the disclosed end-to-end solution for an enterprise potentially opening new opportunities for those routers in their more traditional role.

An example method of performing multi-layer client assurance in a private cellular network includes receiving, by a network entity, a plurality of parameter sets from a plurality of assurance points in the private cellular network, wherein each of the plurality of assurance points is configured to obtain one or more measurements from a portion of the private cellular network corresponding to a client assurance layer in a client assurance stack associated with a client device and combining, based on at least one common parameter, a first parameter set from the plurality of parameter sets with a second parameter set from the plurality of parameter sets to yield a combined parameter set. The first parameter set can be associated with a first client assurance layer and the second parameter set can be associated with a second client assurance layer. The method can further include determining, based on the combined parameter set, a network service level corresponding to the client device.

A system, which can be a network entity, can perform multi-layer client assurance in a private cellular network and can include a processor and a computer-readable storage device storing instructions which, when executed by the processor, cause the processor perform operations including: receiving a plurality of parameter sets from a plurality of assurance points in the private cellular network, wherein each of the plurality of assurance points is configured to obtain one or more measurements from a portion of the private cellular network corresponding to a client assurance layer in a client assurance stack associated with a client device and combining, based on at least one common parameter, a first parameter set from the plurality of parameter sets with a second parameter set from the plurality of parameter sets to yield a combined parameter set. The first parameter set can be associated with a first client assurance layer and the second parameter set can be associated with a second client assurance layer. The operations can further include determining, based on the combined parameter set, a network service level corresponding to the client device.

In another aspect, a method of performing multi-layer client assurance in a private cellular network can include receiving, by a client device, a template for testing a use case of the client device in the private cellular network, wherein the template includes contextual data corresponding to one or more client assurance layers in a client assurance stack associated with the client device and configuring, based on the contextual data, one or more assurance points in the private cellular network to obtain one or more measurements associated with the use case. The one or more assurance points can correspond to at least one of the one or more client assurance layers in the client assurance stack.

A system, which can be a client device, can perform multi-layer client assurance in a private cellular network and can include a processor and a computer-readable storage device storing instructions which, when executed by the processor, cause the processor perform operations including: receiving a template for testing a use case of the client device in the private cellular network, wherein the template includes contextual data corresponding to one or more client assurance layers in a client assurance stack associated with the client device and configuring, based on the contextual data, one or more assurance points in the private cellular network to obtain one or more measurements associated with the use case. The one or more assurance points can correspond to at least one of the one or more client assurance layers in the client assurance stack.

DESCRIPTION OF EXAMPLE EMBODIMENTS

Disclosed herein are systems, methods, and computer-readable media for performing multi-layer client assurance in a private cellular network. The present technology provides systems and techniques that can be used to evaluate performance of a service in a private cellular network (PCN) based on data or information associated with an end-point that accesses the service. In one illustrative example, multiple assurance points (e.g., physical or virtual) are deployed within the PCN that can obtain data or measurements directly from different portion of the network infrastructure that services customer end-points. In some cases, the assurance points can include a client assurance point, a radio access network (RAN) assurance point, a network mobility and switching (e.g., IP) assurance point, an application hosting domain assurance point, and/or an application assurance point. Other assurance points can also be utilized.

In some examples, the assurance points can obtain measurements or data from different portions of the network and provide the data to a network entity that may process the data to obtain an end-to-end view of the network performance. For instance, the network entity may stitch together data corresponding to different portion of the network (e.g., RAN and application) to determine whether the service meets metrics corresponding to a service level agreement (SLA) and/or to identify causes of deficient performance.

In some aspects, a client device may include a client assurance stack having multiple layers for configuring different aspects of the PCN. For instance, the client assurance stack may include an application layer, a host/domain layer, a network (IP) layer, a radio layer, and/or a user equipment (UE) layer. In some cases, a use case template may be used to configure use case tests via the client assurance stack. For example, the use case template may include contextual information that can be used by the client assurance stack and/or client device to configure one or more assurance points within the network to performance measurements associated with a use case (e.g., service).

Deploying private networks for enterprises will require operators to take a different approach to managing their network performance while guaranteeing contracted service level agreements (SLAs). Service assurance has become an important component of network architecture. Operators need to integrate an automated assurance solution that runs from the RAN to the core network. The assurance solution can include monitoring, analyzing and predicting network issues to ensure end-users receive a high quality of experience and service delivery meets promised SLAs.

Automated assurance enables the quick and effective validation of network and service performance, isolates network degradations, and proactively pinpoints the root cause. The capabilities of an automated assurance system enable (1) full visibility into user's private networks and their Quality of Service/Quality of Experience (QoS/QoE); (2) advanced troubleshooting and root cause analysis to find and resolve issues quickly; (3) proactive and continuous monitoring of QoE and QoS to confirm SLAs; and (4) anticipate service degradations in real-time, setting up alarms to notify if any SLAs are breached.

PCNs offer enterprise customers guaranteed service quality for mission-critical applications and services. Assuring private mobile networks enables customers to monitor, analyze, and detect degradations in each private network performance in real-time and across all domains. Thus, ensuring that SLAs are met, and enterprise customers can seamlessly run their newly digitized apps and services.

Figure 1:
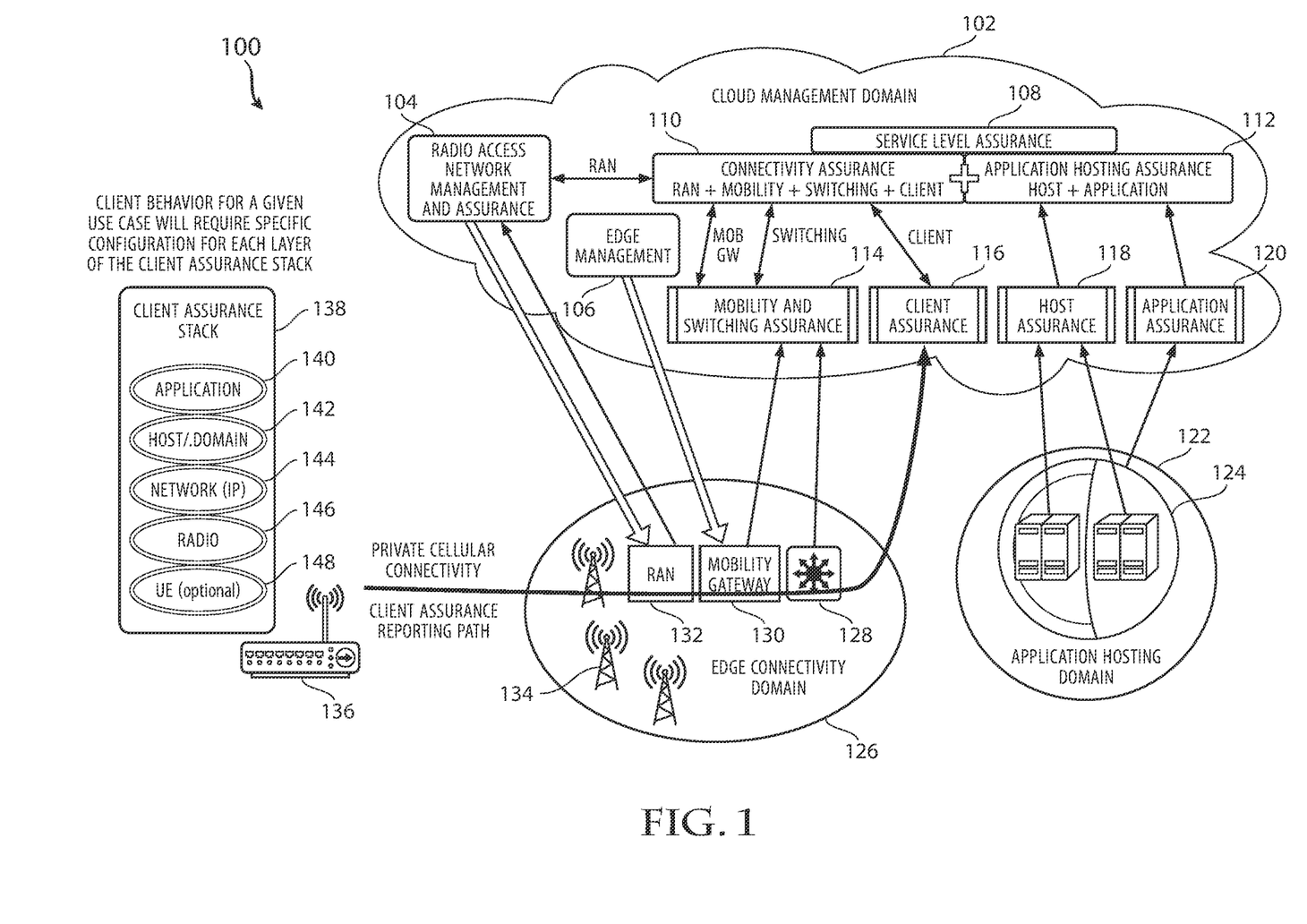
FIG. 1 illustrates a topology of a network in which the innovation disclosed herein can apply.

FIG. 1 illustrates the basic environment 100 that include a cloud management domain 102 having a number of different modules related to providing assurance in the context of a PCN. A radio access network (RAN) management and assurance module 104 communicates via a radio access network (RAN) with a service level assurance module 108 that includes a connectivity, assurance module 110 and an application hosting assurance module 112. The connectivity assurance module 110 provides a mobile gateway (GW) and switching functionality with a mobility and switching assurance module 114. The connectivity assurance module 110 also provides client communications with a client assurance module 116, The RAN management and assurance module 104 communicates with modules in an edge connectivity domain 126 which includes switches or a RAN-UPF transport 128, a mobility gateway 130 and a RAN 132, as well as radio towers 134.

An edge management module 106 communicates with the mobility gateway 130 in the edge connectivity domain 126. The mobility gateway 130 also communicates with the mobility and switching assurance module 114. A host assurance module 118 communicates with individual host devices 124 in an application hosting domain 122. An application assurance module 120 in the cloud management domain 102 also communicates with applications 124 in the application hosting domain 122. Note that the feature 124 can represent either the host computer in the application hosting domain 122 or the application(s) running on the host computer.

A wireless device 136 can include one or more various layers of a client assurance stack including an application layer 140, a host/domain layer 142, a network (IP) layer 144, a radio layer 146 and a user equipment layer 148. A wireless device 136 having an antenna enables a channel to provide private cellular connectivity through a radio tower 134, the RAN 132, the mobility, gateway 130, the switch or RAN-UPF transport 128 to the client assurance module 116. The client assurance reporting path also exists between the wireless device 136, through the RAN 132, the mobility gateway 130, the switch or RAN-INF transport 128 to the client assurance module 116 in the cloud management domain 102. One or more of the modules in FIG. 1 can be used to deploy the private cellular network for an enterprise.

FIG. 1 illustrates four areas of innovation disclosed herein. First, the assurance client or wireless device 136 contains one or more distinct assurance stack layers 138 as outlined above, each layer 140, 142, 144, 146, 148 being capable of being tailored to exercise specific use case behavior in the system. Second, domain assurance reporters (RAN 132, GW 130, switch or RAN-UPF transport 128, host/application 124) can provide context along with measurements to the receivers (RAN management and assurance module 104, Mobility and switching assurance module 114, client assurance module 116, host assurance module 118 and application assurance module 120). Third, the assurance report receivers can correspond to each assurance layer and source. Fourth, service level assurance (via the service level assurance module 108) that, based on context information, combines (stitches) client, connectivity (RAN, gateway, switching), host and application assurance to determine a set of SLA measurements for the service supporting the use case. For a given use case, not all reporters may be needed, and not all assurance client layers may be needed.

There are a number of capabilities included within the system 100. The system 100 can perform use case templating and assurance point behavior derivation. The system 100 can perform active service assurance or a configuration/'activation approach. The system 100 can perform contextual assurance reporting as well as contextual assurance collation (or stitching).

Figure 2:
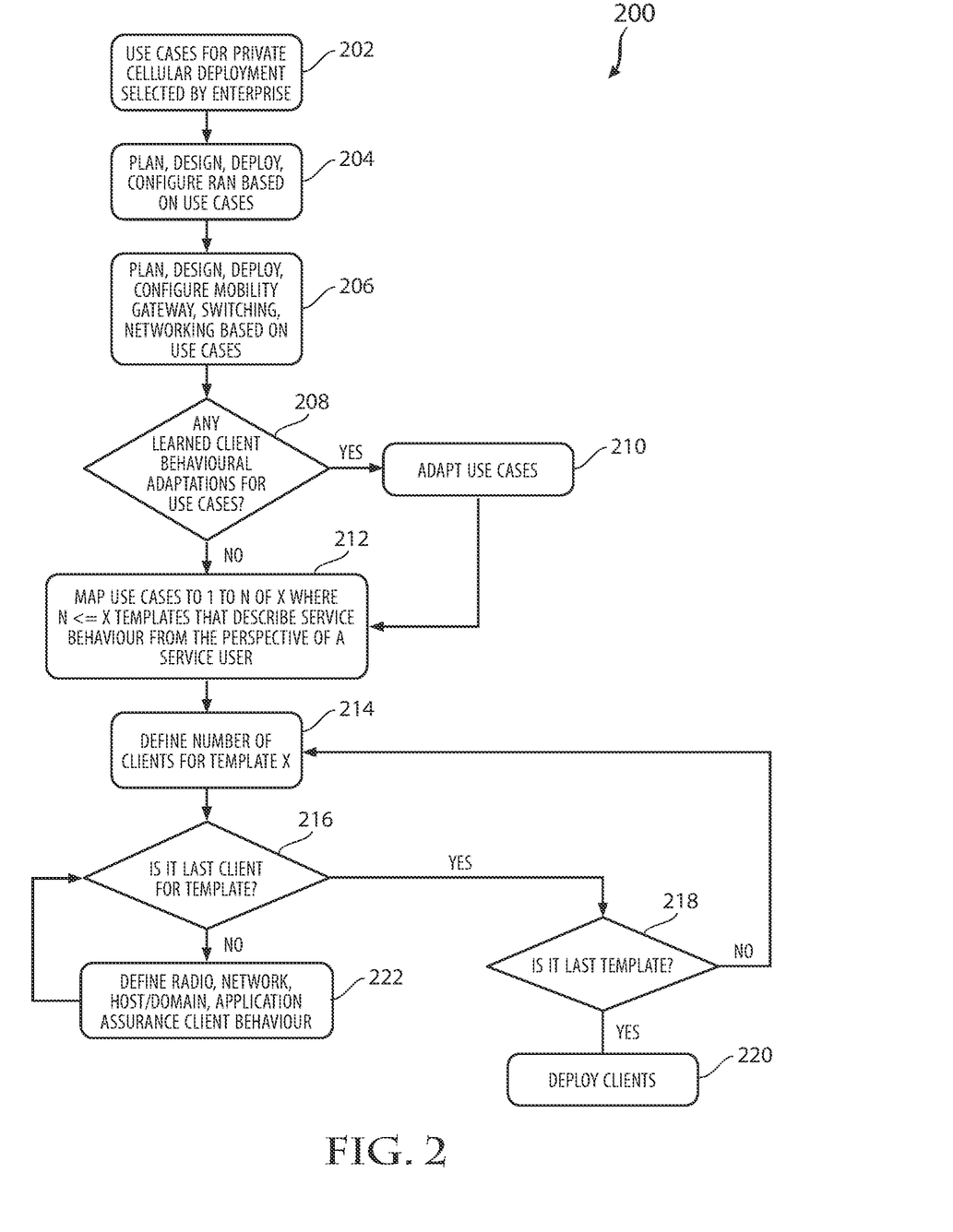
FIG. 2 illustrates a method embodiment related to use case templating and assurance point behavior derivation.
Figure 3:
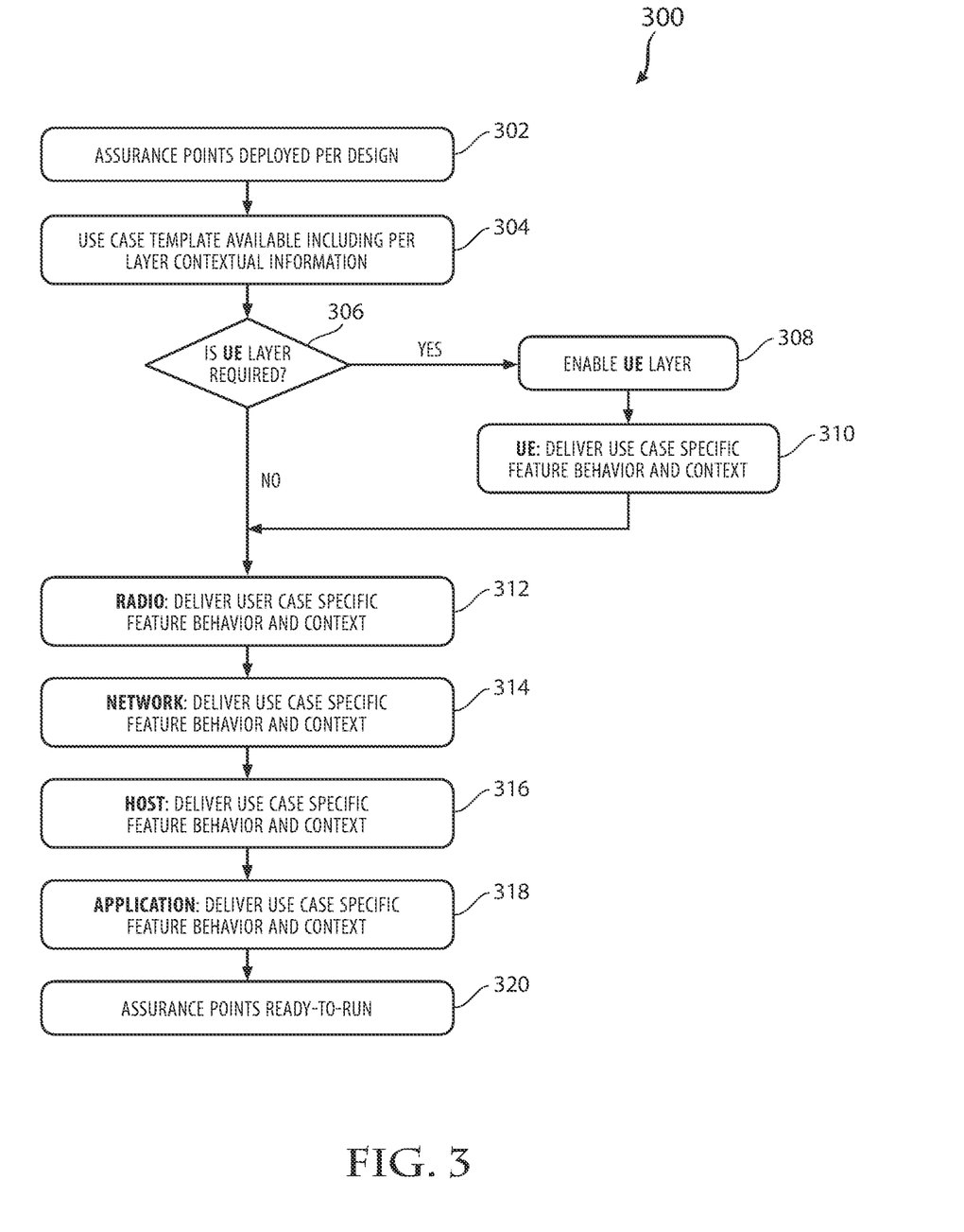
FIG. 3 illustrates an active service assurance process for its configuration and activation, in accordance with some examples.

FIG. 2 illustrates an example block diagram of the process of user case templating, and assurance point behavior derivation 200. In block 202, an enterprise customer or some other entity selects use cases for private cellular deployment. Use cases can include such characteristics as the applications needed, types and number of client devices or wireless device 136, types and characteristics of network devices, service level agreement terms, and so forth. In block 204, a configured RAN 132 is planned, designed and deployed based on the use cases. Block 206 relates to planning, designing and deploying a configured mobility gateway and implementing switching and networking components based on the use cases. In block 208, the system determines whether any learned client behavioral adaptations are available for the use cases. If yes, then block 210 applies to adapt to the use cases. If no, then block 212 applies to map use cases to 1 to N of X templates where N<=X templates that describe service behavior from the perspective of a service user. Block 214 includes defining a number of clients for template X. In block 216, the system determines if a respective client is the last client for a template. If yes, in block 218, the system determines if the current template is the last template of the 1 to N templates. If no, then the process returns to block 214. If yes, the process proceeds to block 220 in which the clients or wireless devices 136 are deployed. If the answer to the question in block 216 is no, then in block 222, the system defines the radio, network, host/domain, and application assurance client behavior, FIG. 3 illustrates a block diagram 300 of the process of providing active service assurance for configuration and activation of the private network. In block 302, the assurance points are deployed per the design described in FIG. 2. In block 304, the use case template is made available including per layer contextual information. In block 306, the system determines whether the user equipment (UE) layer 148 is required. If yes, then in block 308, the system enables the UE layer 148. In block 310, the LIE or client or wireless device 136 delivers use case specific feature behavior and context. If the answer is no to the question in block 306, then the process continues to the remaining blocks with respect to reporting behavior and context. In block 312, the RAN 104 delivers use case specific feature behavior and context to the RAN management and assurance module 104 shown in FIG. 1, and in block 314, the network (which can be the mobility gateway 130 and/or the switch or RAN-UPF transport 128) delivers use case specific feature behavior and context to one or more of the RAN management and assurance module 104 and the mobility and switching assurance module 114. In block 316, the host 124 delivers use case specific feature behavior and context to the host assurance module 118 and in block 318, the application 124 delivers use case specific feature behavior and context to the application assurance module 120. These various modules can then deliver their respective data to the connectivity assurance module 110 and the application hosting assurance module 112 which are part of the service level assurance module 108. In block 320, the assurance points are ready to run to provide the assurance for private cellular connectivity.

Figure 4A:
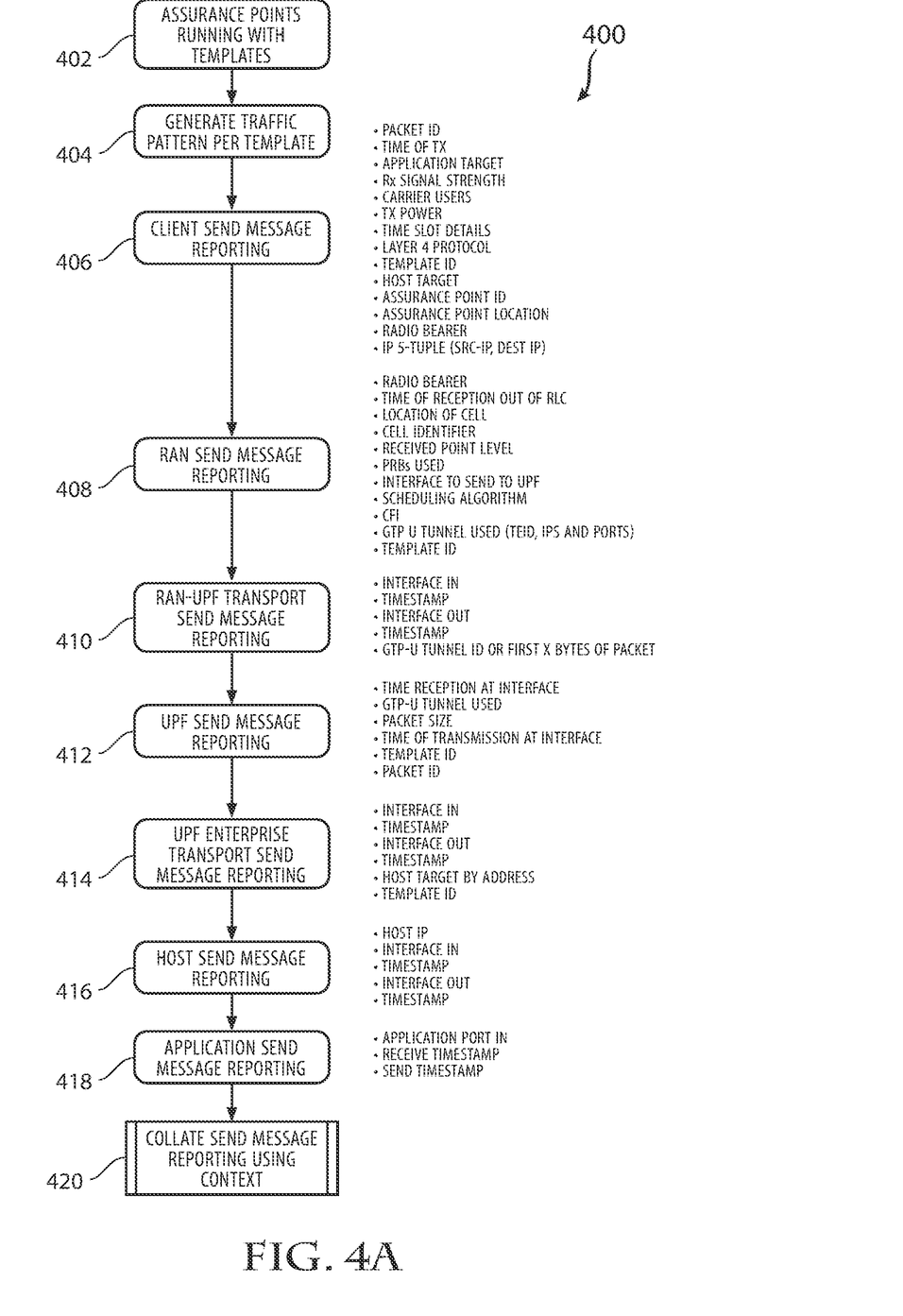
FIG. 4A illustrates the contextual assurance reporting process, in accordance with some examples.

FIG. 4A illustrates contextual assurance reporting 400 with e examples. In block 402, the assurance points are running according to the templates. In block 404, the system generates a traffic pattern per template. For example, every 10 minutes, the system may generate a 5 second burst of 100 packets having a minimal size packet destined for an application 124 hosted in the enterprise network. A response may be expected with a similar burst. In block 406, the client send message reporting step occurs. The message can include such data as one or more of a packet ID, a time of transmission, an application target, a received signal strength, a carrier used, a transmission power, time slot details, layer 4 protocol data, a template ID, a host target, an assurance point ID, an assurance point location, a radio bearer, and/or IP 5-tuple (src-IP (source IP address), dst-IP (destination IP address), etc.). It can be assumed that there is an integrated 5G base station or other gNodeB radio or other cellular base station for this example.

In block 408, the RAN 132 sends a message with its reporting data. Such data can include one or more of the radio bearer, a time of reception out of radio link control, a location of a cell, a cell identifier, a received power level, physical resource blocks (PRBs) used, an interface to send to a user plane function (UPF), a scheduling algorithm, control format indicator (CFI), a GPRS tunneling protocol (GTP-U) tunnel used (TEID (unique tunnel endpoint identifier), IPs and ports) and a template ID. In block 410, the RAN-UPF transport 128 sends a message with its reporting which can include one or more of an Interface In, a first timestamp, an Interface Out, a second timestamp, and a GTP-U tunnel ID or first x bytes of a packet. In block 412, the UPF sends a message with its reporting which can include one or more of a time reception at interface, a GTP-U tunnel used, a packet size, a time of transmission at interface, a template ID and a packet ID. At block 414, the UPF-enterprise transport 128 sends its message reporting which can include one or more of an Interface In, a first timestamp, an Interface Out, a second timestamp, a host target by address, and/or a template ID. In block 416, the host 124 sends a message with reporting which can include one or more of a host IP, an Interface In, a first timestamp, an Interface Out, and/or a second timestamp. In block 418, the application 124 sends its message for reporting which can include an application port In, a receive timestamp, an application port Out, and a send timestamp. In block 420, the service level assurance module 108 or some other module can collate the received messages using a context.

FIG. 4A shows an example set of parameters reported and potential values carried within packets (e.g. Packet-ID). Other information could be included such as a 'descriptive' tag carried in a packet. Reports could include a software version of a node and/or other data, such as a UPF version, a host model, a Features-In-Use at a node, an application version and so forth. The set of information reported is determined by the use-case and the SLAB defined for the use-case.

There are multiple ways to carer additional fields in packet headers such as IPv6 extension headers, MPLS (multiprotocol label switching) entropy label reuse, SRv6 extensions, GTP-U header extensions and so on. For a private cellular service as shown in FIG. 1, as all network elements are designed to the requirements of the service, support for additional packet fields to support this idea can form part of the requirements for those elements. Aspects of the idea could also be applied to a multi-vendor solution where one or more elements may not support the optimal context set.

Figure 4B:
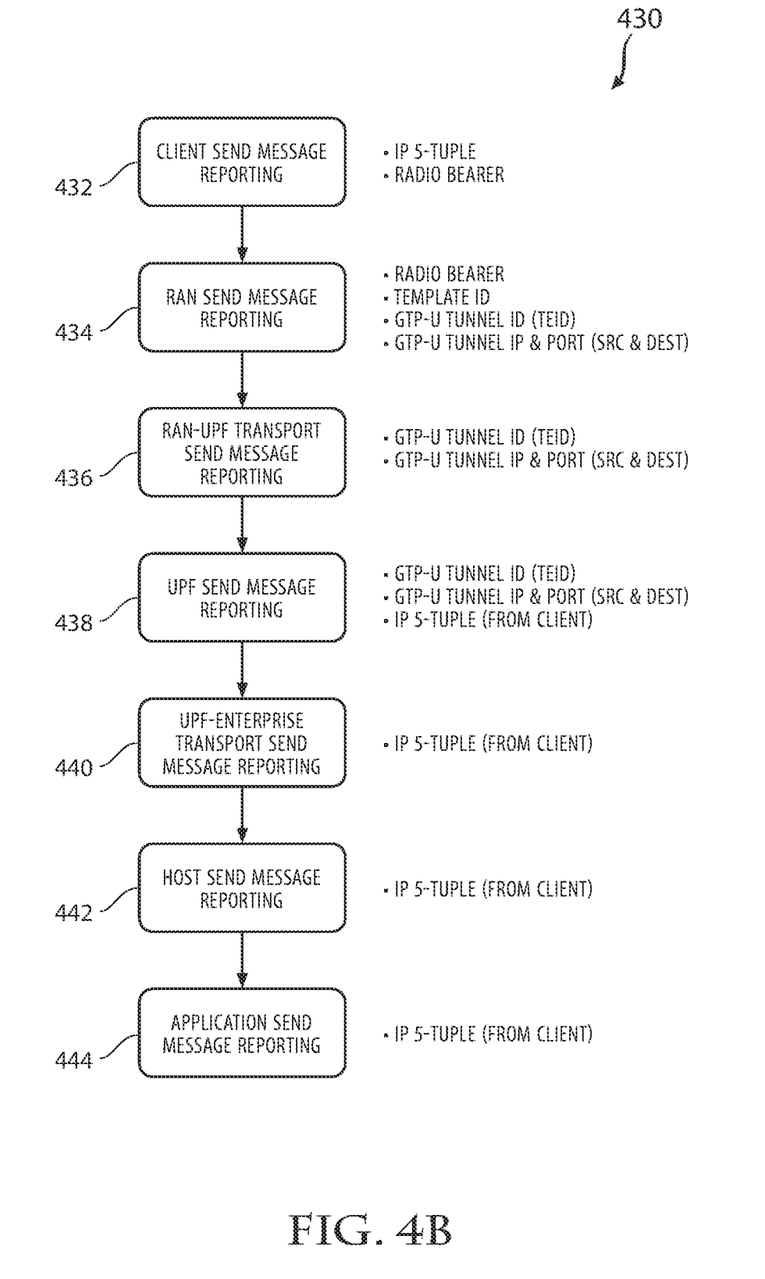
FIG. 4B illustrates the contextual assurance collation process, in accordance with some examples.

FIG. 4B illustrates contextual assurance collation or stitching 430 from various assurance points. In this figure, the various concepts illustrate how end-to-end stitching can be performed based on information obtained from the individual assurance points. In block 432, the client or wireless device 136 can send its reporting message which can include data such as the radio bearer and an IP 5-tuple. In block 434, the RAN 132 can send its reporting message which can include data such as the radio bearer, template ID, a GTP-U tunnel (TED) and a GTP-U tunnel IP and Port (src & dest). In block 436, the RAN-LIT transport 128 can send its reporting message which can include GTP-U tunnel ID (TEID), a GTP-U tunnel IP & port (src and dest). In block 438, the UPF can send its reporting message which can include the GTP-U tunnel ID (TED), the GTP-U tunnel IP and port (src and dest) and the IP 5-tuple from the client or wireless device 136. In block 440, the UPF-Enterprise transport 128 can send its reporting message with the IP 5-tuple from the client or wireless device 136. In block 442, the host 124 can send its reporting message with the IP 5-tuple from the client or wireless device 136, In block 444, the application 124 can send its reporting message with the 5-tuple from the client or wireless device 136. The IP 5-tuple data can be stitched together as well as the radio bearer data. The GTP-U tunnel ID (TEID) and the GTP-U tunnel IP and Port (src & dest) data from the various sources can also be stitched together from the individual assurance points. This can occur via the service level assurance module 108.

What is described above is a straightforward case where additional data beyond what is well-known in packet headers is used. Further examples can be envisaged where 'packet-id' plus 'descriptive-tap' could be used. Also, some kind of textual application identification could be carried, e.g. 'Webex Collaboration Video', 'MS-Rich-Messaging' and used as the basis for collation.

The disclosed system enables the assurance context, sourced from multiple domains of the solution, can be combined to build an end-to-end view and subsequent assessment of the expected behaviors from the perspective service users and operators. A system of a multi-layer client assurance architecture, the behavior of which can be tailored based on expected and learned use-case behaviors. A system can have one or more assurance points that actively probes the system according to expected and learned behaviors of the offered services.

Figure 5A:
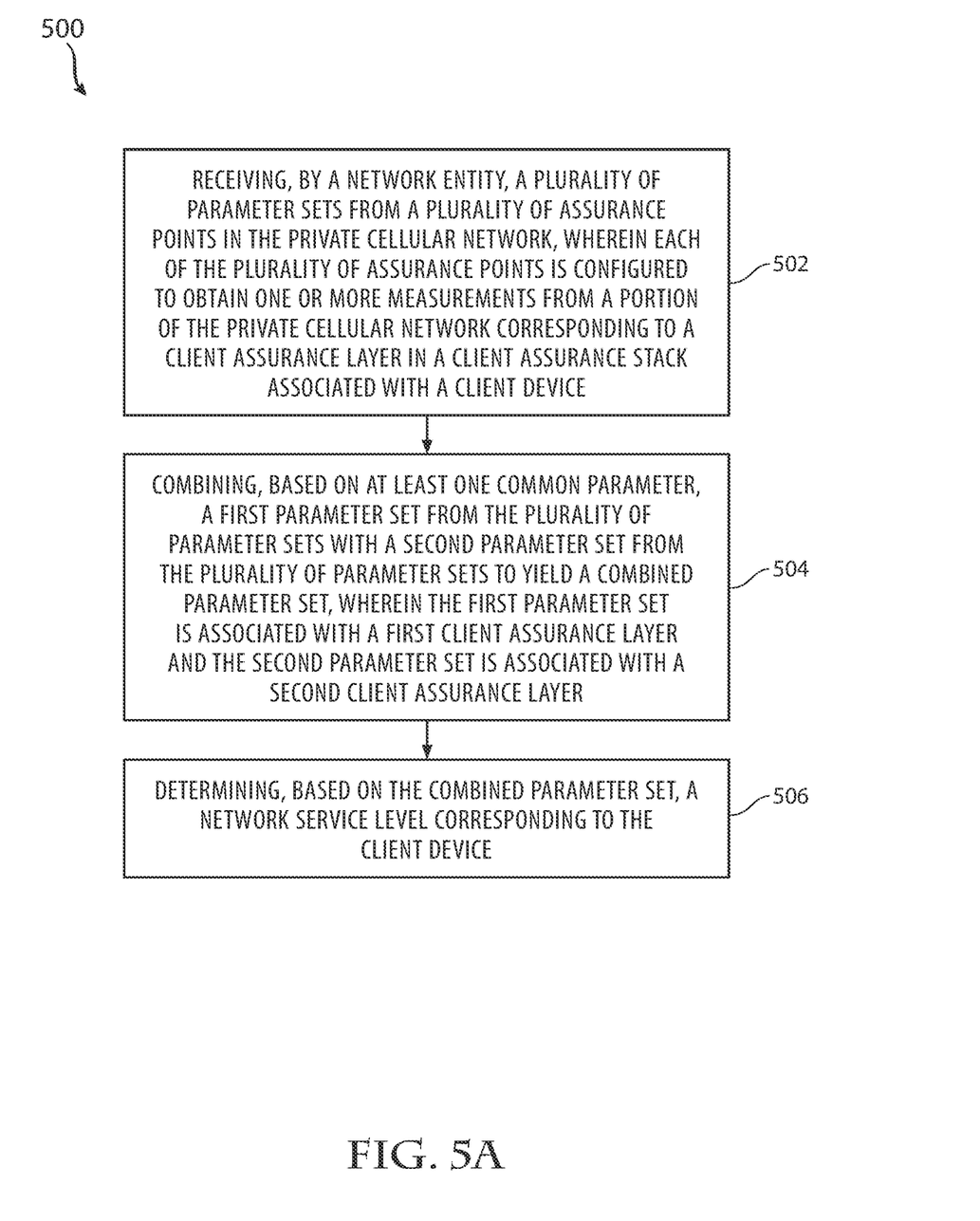
FIG. 5A illustrates a method embodiment, in accordance with some examples.

FIG. 5A illustrates a method embodiment 500 for performing multi-layer client assurance in a private cellular network. The method can include receiving, by a network entity, a plurality of parameter sets from a plurality of assurance points in the private cellular network, wherein each of the plurality of assurance points is configured to obtain one or more measurements from a portion of the private cellular network corresponding to a client assurance layer in a client assurance stack 138 associated with a client device (502), combining, based on at least one common parameter, a first parameter set from the plurality of parameter sets with a second parameter set from the plurality of parameter sets to yield a combined parameter set, wherein the first parameter set is associated with a first client assurance layer and the second parameter set is associated with a second client assurance layer (504) and determining, based on the combined parameter set, a network service level corresponding to the client device (506).

The client assurance stack 138 on a wireless device 136 can include at least one of an application layer 140, a host/domain layer 142, a network (IP) layer 144, a radio layer 146 and an optional user equipment layer 148. The client assurance stack 138 may also be distributed in whole or in part to other network elements.

The portion of the private cellular network includes at least one of the wireless device 136, a radio access network (RAN) 132, a user plane function (UPF) 128, an application host 124, and an application 124. In one aspect, the at least one common parameter includes at least one of an internet protocol (JP) 5-tuple, a radio bearer, a general packet radio service (GPRS) tunnelling protocol (GTP) tunnel endpoint identifier (TEID), and a GTP-U tunnel IP address.

The method of FIG. 5A can further include one or more of determining that the network service level does not comply with a service level agreement and identifying the portion of the private cellular network for improving the network service level.

A system, which can be a network entity such as the service level assurance module 108 or other network entity, can perform multi-layer client assurance in a private cellular network and can include a processor and a computer-readable storage device storing instructions which, when executed by the processor, cause the processor perform operations including: receiving a plurality of parameter sets from a plurality of assurance points (such as modules 104, 114, 116, 118, 120) in the private cellular network, wherein each of the plurality of assurance points is configured to obtain one or more measurements from a portion of the private cellular network corresponding to a client assurance layer in a client assurance stack 138 associated with a client device. The operations can further include combining, based on at least one common parameter, a first parameter set from the plurality of parameter sets with a second parameter set from the plurality of parameter sets to yield a combined parameter set. The first parameter set can be associated with a first client assurance layer and the second parameter set can be associated with a second client assurance layer. For example, the client assurance layers can relate to the various layers on the wireless device 136 shown in FIG. 1, The operations can further include determining, based on the combined parameter set, a network service level corresponding to the wireless device 136.

Figure 5B:
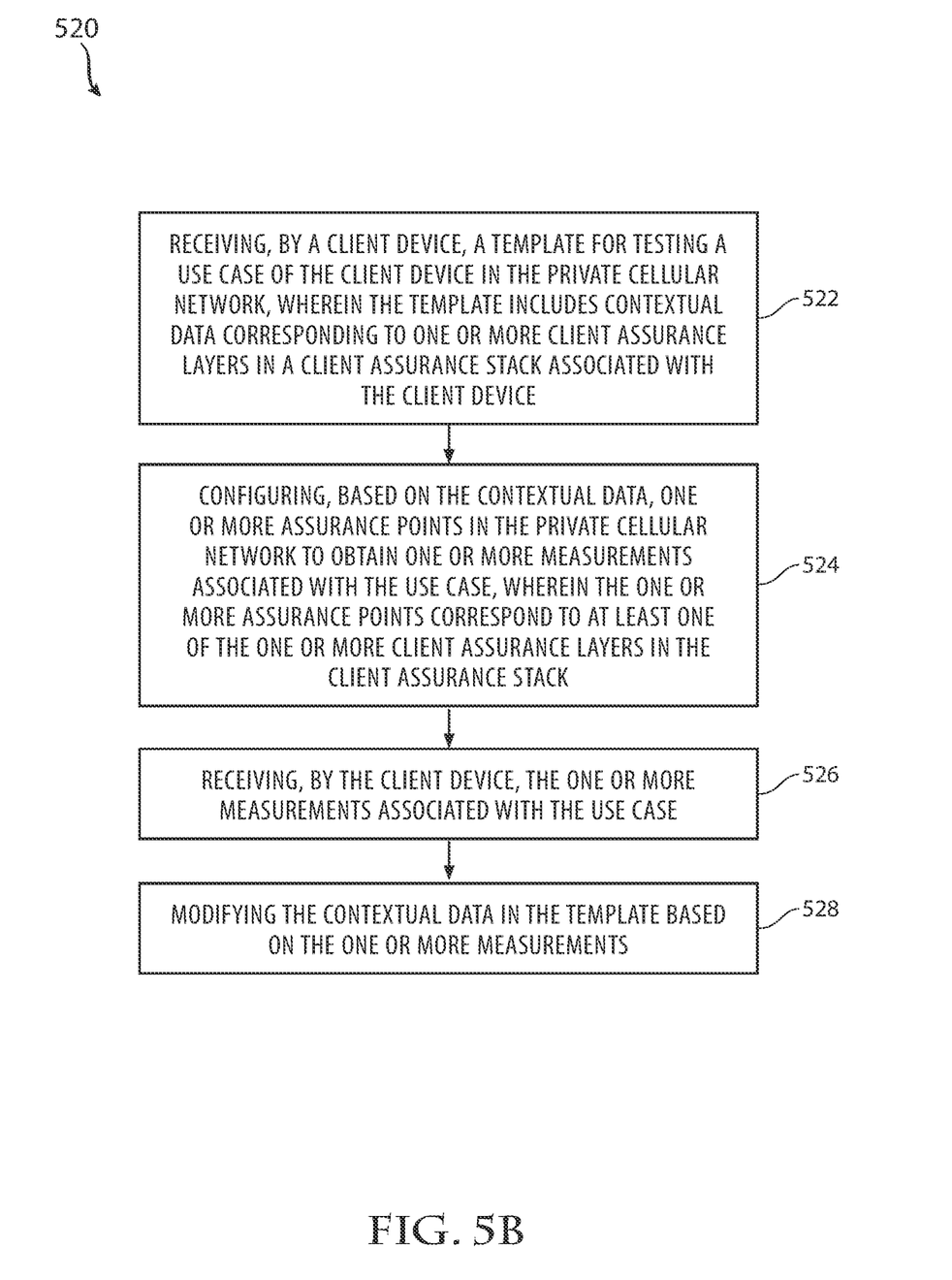
FIG. 5B illustrates another method embodiment, in accordance with some examples.

FIG. 5B illustrates another example method 520 which can include one or more steps for performing multi-layer client assurance in a private cellular network. The method 520 can include receiving, by a wireless device 136, a template for testing a use case of the wireless device 136 in the private cellular network, wherein the template includes contextual data corresponding to one or more client assurance layers in a client assurance stack 138 associated with the wireless device 136 (522) and configuring, based on the contextual data, one or more assurance points in the private cellular network to obtain one or more measurements associated with the use case, wherein the one or more assurance points correspond to at least one of the one or more client assurance layers in the client assurance stack 138 (524), The method can further include receiving, by the wireless device 136, the one or more measurements associated with the use case (526) and modifying the contextual data in the template based on the one or more measurements (528).

The contextual data can include one or more network parameters corresponding to a service level agreement associated with the use case. The one or more assurance points can include at least one of a client assurance point 116, a radio access network (RAN) assurance point 104, a network mobility and switching assurance point 114, an application host assurance point 118, and an application assurance point 120.

A system, which can be a wireless device 136, can perform multi-layer client assurance in a private cellular network and can include a processor and a computer-readable storage device storing instructions which, when executed by the processor, cause the processor perform operations including: receiving a template for testing a use case of the wireless device 136 in the private cellular network, wherein the template includes contextual data corresponding to one or more client assurance layers in a client assurance stack 138 associated with the wireless device 136 and configuring, based on the contextual data, one or more assurance points 104, 114, 116, 118, 120 in the private cellular network to obtain one or more measurements associated with the use case. The one or more assurance points can correspond to at least one of the one or more client assurance layers in the client assurance stack 138.

Figure 6:
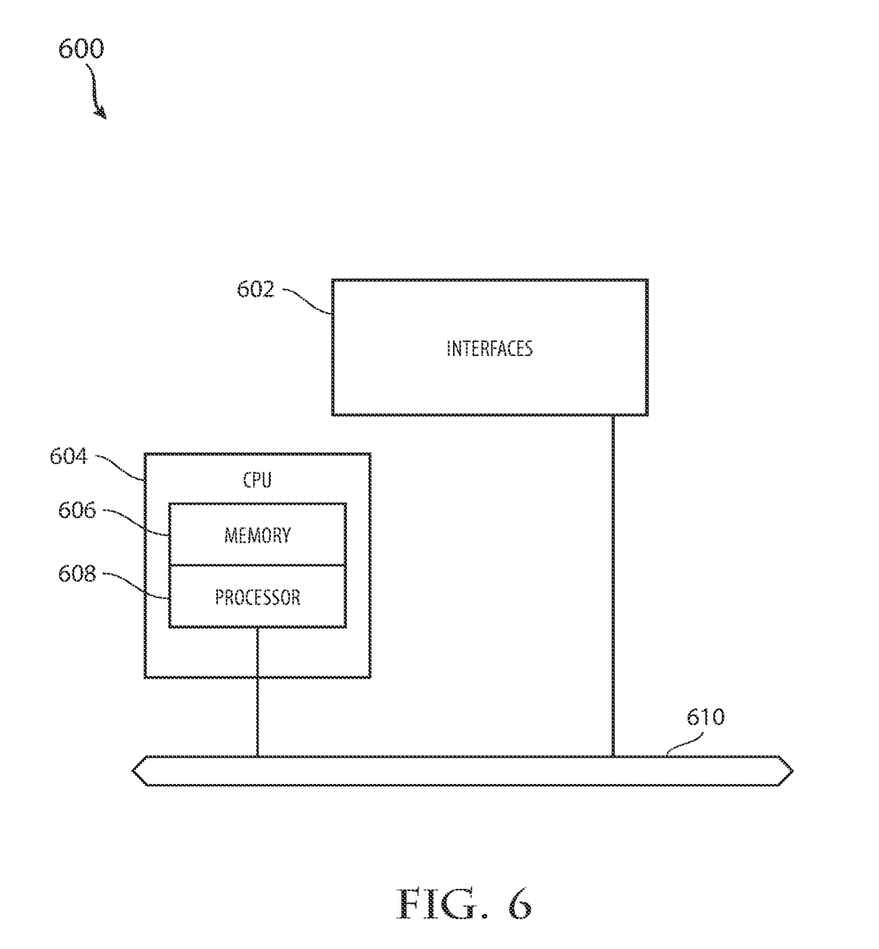
FIG. 6 illustrates an example networking device, in accordance with some examples.

FIG. 6 illustrates an example network device 600 suitable for implementing aspects of this disclosure. The network device 600 includes a central processing unit (CPU) 604, interfaces 602, and a connection 610 (e.g., a PCI bus). When acting under the control of appropriate software or firmware, the CPU 604 is responsible for executing packet management, error detection, and/or routing functions. The CPU 604 preferably accomplishes all these functions under the control of software including an operating system and any appropriate applications software. The CPU 604 may include one or more processors 608, such as a processor from the INTEL X86 family of microprocessors. In some cases, processor 608 can be specially designed hardware for controlling the operations of the network device 600. In some cases, a memory 606 (e.g., non-volatile RAM, ROM, etc.) also forms part of the CPU 604. However, there are many different ways in which memory could be coupled to the system.

The interfaces 602 are typically provided as modular interface cards (sometimes referred to as "line cards"). Generally, they control the sending and receiving of data packets over the network and sometimes support other peripherals used with the network device 600. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WiFi interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the CPU 604 to efficiently perform routing computations, network diagnostics, security functions, etc.

Although the system shown in FIG. 6 is one specific network device of the present technologies, it is by no means the only network device architecture on which the present technologies can be implemented. For example, an architecture having a single processor that handles communications as well as routing computations, etc., is often used. Further, other types of interfaces and media could also be used with the network device 600.

Regardless of the network device's configuration, it may employ one or more memories or memory modules (including memory 606) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. The memory 606 could also hold various software containers and virtualized execution environments and data.

The network device 600 can also include an application-specific integrated circuit (ASIC), which can be configured to perform routing and/or switching operations. The ASIC can communicate with other components in the network device 600 via the connection 610, to exchange data and signals and coordinate various types of operations by the network device 600, such as routing, switching, and/or data storage operations, for example.

Figure 7:
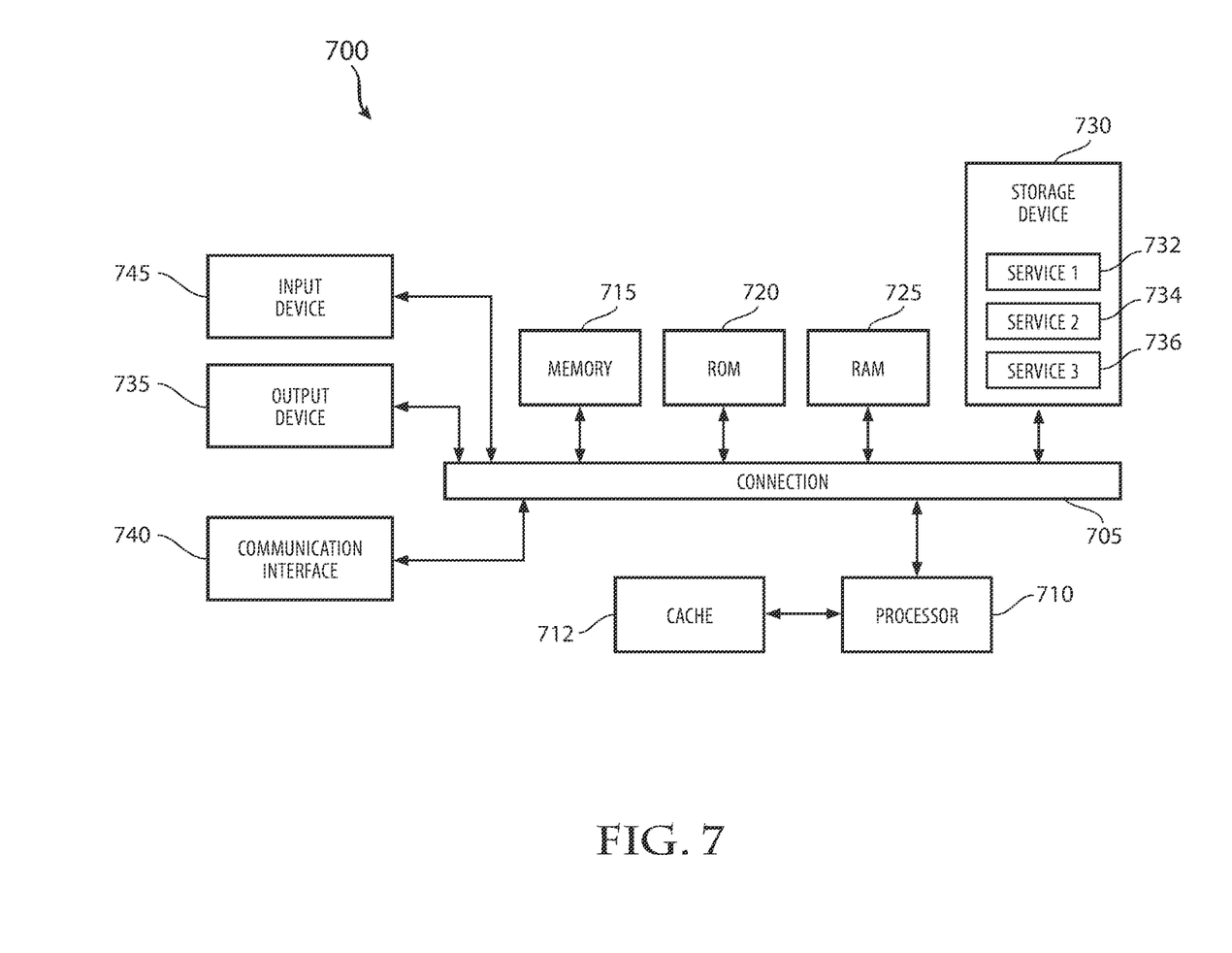
FIG. 7 illustrates an example computing device architecture, in accordance with some examples.

FIG. 7 illustrates an example computing device architecture 700 of an example computing device which can implement the various techniques described herein. The components of the computing device architecture 700 are shown in electrical communication with each other using a connection 705, such as a bus. The example computing device architecture 700 includes a processing unit (CPU or processor) 710 and a computing device connection 705 that couples various computing device components including the computing device memory 715, such as read only memory (ROM) 720 and random access memory (RAM) 725, to the processor 710.

The computing device architecture 700 can include a cache of high-speed memory connected directly with, in close proximity to, or integrated as part of the processor 710. The computing device architecture 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other computing device memory 715 may be available for use as well. The memory 715 can include multiple different types of memory with different performance characteristics. The processor 710 can include any general purpose processor and a hardware or software service, such as service 1 732, service 2 734, and service 3 736 stored in storage device 730, configured to control the processor 710 as well as a special-purpose processor where software instructions are incorporated into the processor design. The processor 710 may be a self-contained system, containing multiple cores or processors, a bus, memory controller, cache, etc. A multi-core processor may be symmetric or asymmetric.

To enable user interaction with the computing device architecture 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art, such as a display, projector, television, speaker device, etc. In some instances, multimodal computing devices can enable a user to provide multiple types of input to communicate with the computing device architecture 700. The communications interface 740 can generally govern and manage the user input and computing device output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof. The storage device 730 can include services 732, 734, 736 for controlling the processor 710. Other hardware or software modules are contemplated. The storage device 730 can be connected to the computing device connection 705, In one aspect, a hardware module that performs a particular function can include the software component stored in a computer-readable medium in connection with the necessary hardware components, such as the processor 710, connection 705, output device 735, and so forth, to carry out the function.

For clarity of explanation, in some instances the present technology may be presented as including individual functional blocks including functional blocks including devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A method of performing multi-layer client assurance in a private cellular network, comprising:
   receiving, by a network entity, a plurality of parameter sets from a plurality of assurance points in the private cellular network, wherein each of the plurality of assurance points is configured to obtain one or more measurements from a portion of the private cellular network corresponding to a client assurance layer in a client assurance stack associated with a client device;
   combining, based on at least one common parameter, a first parameter set from the plurality of parameter sets with a second parameter set from the plurality of parameter sets to yield a combined parameter set, wherein the first parameter set is associated with a first client assurance layer and the second parameter set is associated with a second client assurance layer; and
   determining, based on the combined parameter set, a network service level corresponding to the client device.

2. The method of claim 1, wherein the client assurance stack includes at least one of a client layer, a radio layer, a network layer, a host layer, and an application layer.

3. The method of claim 1, wherein the portion of the private cellular network includes at least one of the client device, a radio access network (RAN), a user plane function (UPF), an application host, and an application.

4. The method of claim 1, wherein the at least one common parameter includes at least one of an internet protocol (IP) 5-tuple, a radio bearer, a general packet radio service (GPRS) tunnelling protocol (GTP) tunnel endpoint identifier (TEID), and a GTP-U tunnel IP address.

5. The method of claim 1, further comprising:
   determining that the network service level does not comply with a service level agreement; and
   identifying the portion of the private cellular network for improving the network service level.

6. The method of claim 1, wherein the combining is performed via a several level assurance module in a cloud management domain.

7. A network entity for performing multi-layer client assurance in a private cellular network, the network entity comprising:
   a processor; and
   a computer-readable storage device storing instructions which, when executed by the processor, cause the processor perform operations comprising:
      receiving a plurality of parameter sets from a plurality of assurance points in the private cellular network, wherein each of the plurality of assurance points is configured to obtain one or more measurements from a portion of the private cellular network corresponding to a client assurance layer in a client assurance stack associated with a client device;
      combining, based on at least one common parameter, a first parameter set from the plurality of parameter sets with a second parameter set from the plurality of parameter sets to yield a combined parameter set, wherein the first parameter set is associated with a first client assurance layer and the second parameter set is associated with a second client assurance layer; and
      determining, based on the combined parameter set, a network service level corresponding to the client device.

8. The network entity of claim 7, wherein the client assurance stack includes at least one of a client layer, a radio layer, a network layer, a host layer, and an application layer.

9. The network entity of claim 7, wherein the portion of the private cellular network includes at least one of the client device, a radio access network (RAN), a user plane function (UPF), an application host, and an application.

10. The network entity of claim 7, wherein the at least one common parameter includes at least one of an internet protocol (IP) 5-tuple, a radio bearer, a general packet radio service (GPRS) tunnelling protocol (GTP) tunnel endpoint identifier (TEID), and a GTP-U tunnel IP address.

11. The network entity of claim 7, wherein the computer-readable storage device stores additional instructions which, when executed by the processor, cause the processor perform operations further comprising:
    determining that the network service level does not comply with a service level agreement; and
    identifying the portion of the private cellular network for improving the network service level.

12. The network entity of claim 7, wherein the combining is performed via a several level assurance module in a cloud management domain.

* * * * *